United States Patent [19]

Shuey

[11] Patent Number: 5,451,168

[45] Date of Patent: Sep. 19, 1995

[54] CONNECTOR APPARATUS FOR MEMORY CARDS HAVING A ONE-PIECE INTEGRATED FRAME

[75] Inventor: Joseph B. Shuey, Camp Hill, Pa.

[73] Assignee: Berg Technology, Inc., Reno, Nev.

[21] Appl. No.: 131,212

[22] Filed: Oct. 1, 1993

[51] Int. Cl.⁶ .......................................... H01R 13/62
[52] U.S. Cl. .................................... 439/159; 439/157
[58] Field of Search ............................ 439/152–160, 439/372

[56] References Cited

U.S. PATENT DOCUMENTS

| | | | |
|---|---|---|---|
| 4,017,770 | 4/1977 | Valfre | 361/399 |
| 4,445,740 | 5/1984 | Wallace | 339/45 M |
| 4,838,804 | 6/1989 | Banjo | 439/325 |
| 4,887,188 | 12/1989 | Yoshida | 361/413 |
| 4,952,161 | 8/1990 | Komatsu | 439/155 |
| 5,026,296 | 6/1991 | Hashiguchi | 439/159 |
| 5,033,972 | 7/1991 | Komatsu | 439/153 |
| 5,051,101 | 9/1991 | Komatsu | 439/159 |
| 5,139,435 | 8/1992 | Komatsu | 439/159 |
| 5,145,389 | 9/1992 | Okubo | 439/159 |
| 5,152,697 | 10/1992 | Abe | 439/152 |
| 5,161,989 | 11/1992 | Okubo | 439/159 |
| 5,176,523 | 1/1993 | Lai | 439/64 |
| 5,225,968 | 7/1993 | Ma | 361/413 |
| 5,234,351 | 8/1993 | Dixon | 439/160 |
| 5,275,573 | 1/1994 | McCleerey | 439/153 |
| 5,304,070 | 4/1994 | Bertho et al. | 439/157 |

OTHER PUBLICATIONS

"AMP" mechanical drawing dated May 12, 1993, entitled Ejector for AMP Memory Card Connector, (sheet 1 of 1).

"AMP" Memory Card/PC Card Connectors, Catalog 65701, Revised 11-93, (pp. 1, 2, 22 and 23).

Ten (10) sheets of Mechanical drawings illustrating a connector apparatus first marketed in Apr., 1993 by the Assignee of the above-captioned application.

DuPont Connector Systems (Berg Electronics), Product Catalog A, pp. 4–6 and 4–7, (Feb. 1992).

Jim Somerville and Tom Grossi, *Memory Cards Mobilize Portable Computers,* Interconnection Technology, pp. 30–31, (Aug. 1993).

*Primary Examiner*—David L. Pirlot
*Attorney, Agent, or Firm*—Woodcock, Washburn, Kurtz, Mackiewicz & Norris

[57] ABSTRACT

A connector apparatus for a memory card comprises a one-piece integrated metallic frame having a cross member and a pair of guide rails integrally extending from the cross member. Mounting means in the form of narrow slots are integrally formed on at least one guide rail to allow the push rod of an ejector mechanism to be mounted on the guide rail. Alternatively, the mounting means may be symmetrically formed on both guide rails to allow selective mounting of the push rod on either guide rail. Various other components of the ejector mechanism are mounted to the one-piece frame via respective tab and slot mechanisms to reduce the need for additional mounting hardware. Other functional components of the connector apparatus are integrally formed on the one-piece frame, including static discharge contacts, spring contacts for memory card grounding points, and mounting provisions for mounting the connector to a printed circuit board. A method of making the connector apparatus comprises forming a blank of the one-piece frame and then bending the blank at predetermined locations to form the integral guide rails.

41 Claims, 10 Drawing Sheets

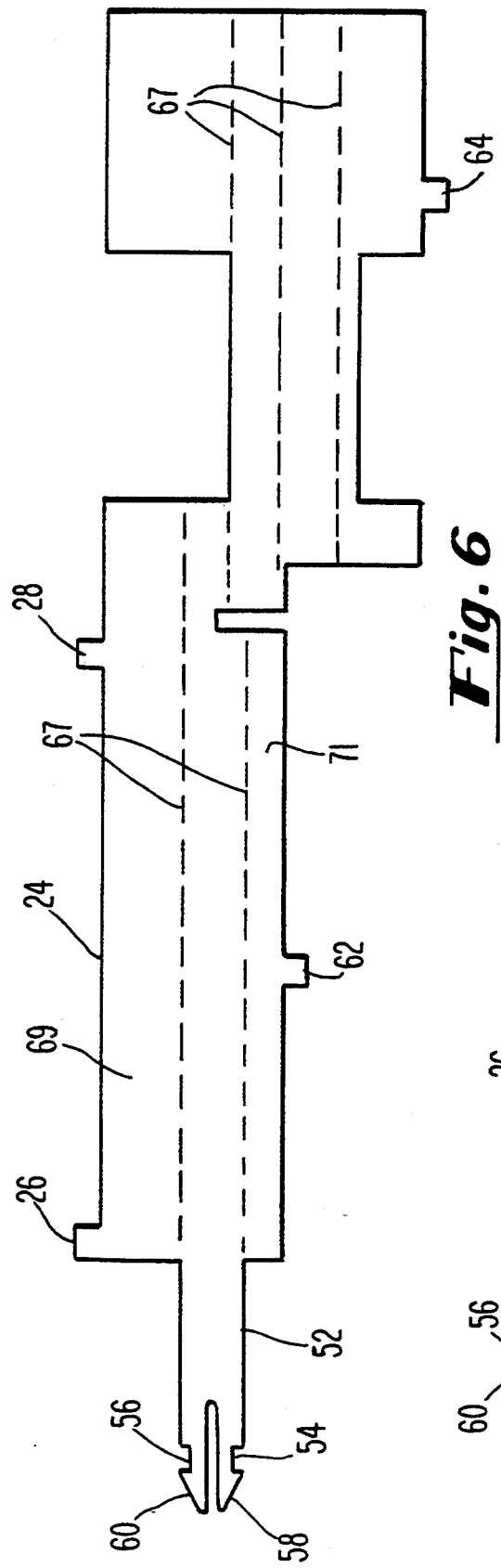
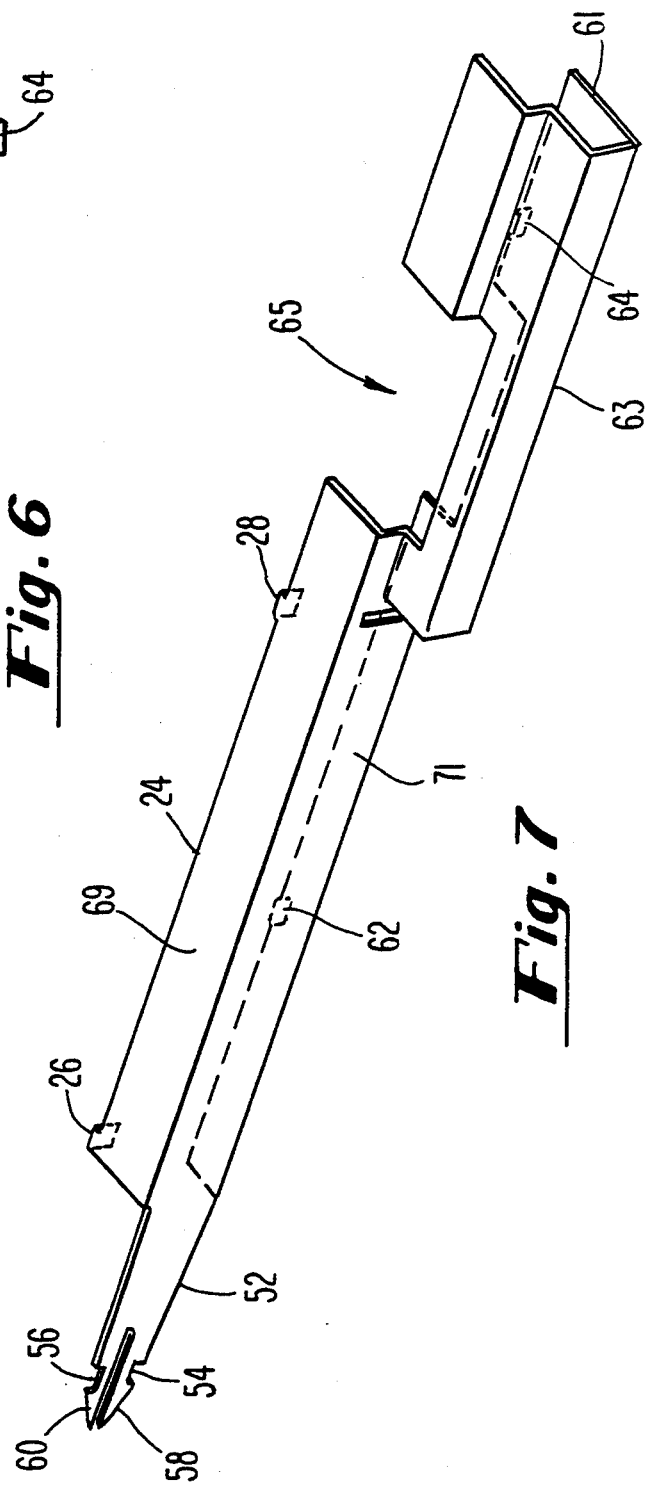
Fig. 6
Fig. 7

CONNECTOR APPARATUS FOR MEMORY CARDS HAVING A ONE-PIECE INTEGRATED FRAME

BACKGROUND OF THE INVENTION

1. Field of the Invention

The present invention relates to a connector apparatus for plate-like integrated circuit cards that can be used to connect such cards to a host device, and more particularly, to a connector apparatus having a one-piece integrated frame, and to a method of making the apparatus.

2. Description of the Prior Art

Plate-like integrated circuit cards, commonly referred to in the art as "memory cards", have become increasingly popular for use in notebook, laptop and desktop computers, as well as other consumer products. Standard specifications from the Personal Computer Memory Card International Association (PCMCIA) and the Japan Electronic Industry Development Association (JEIDA) have helped to expand this relatively new industry. Other standard specifications have been developed by the Joint Electron Device Engineering Council (JEDEC). Although commonly referred to as "memory cards," these cards are by no means limited to data storage applications. For example, some cards may perform various I/O functions for modem and local area network applications.

Currently, the PCMCIA/JEIDA standard cards incorporate a 68-pin female connector at one end, and are available in three formats. Type I houses SRAM, PSRAM, MROM, OPTROM, and flash memory chips and only performs memory functions. Type I cards have a thickness of 3.3 mm. Type II cards perform I/O functions for modem and local area network (LAN) applications. The side edges of Type II cards are 3.3 mm thick, however, the main body of the cards is 5.0 mm thick. Type III cards are really not "cards," but rather 1.8 inch hard disk drives having a 10.5 mm thick housing. Again, however, these cards are equipped with outside edges of 3.3 mm.

Given the increasing popularity of these "memory cards," a need has arisen for suitable connector devices for connecting these cards to printed circuit boards in host devices, such as notebook, laptop and desktop computers. A number of connector devices have appeared in the prior art. Prior art connector devices typically comprise some sort of frame or housing into which a memory card may be inserted. A contact header with an array of pin contacts is provided at the far end of the housing to connect with a corresponding contact array disposed in the front end of the memory card. Many prior art connector devices employ an ejection mechanism having an ejector plate that engages with the memory card, a rotatable lever mounted on the housing and coupled at one end to the ejector plate, and a push rod coupled to the other end of the lever. To eject a memory card, the push rod is manually driven toward the contact header. Movement of the push rod toward the contact header is translated through the rotating lever into movement of the ejector plate away from the contact header. As the ejector plate moves away from the contact header, it engages with the memory card thereby disconnecting the memory card from the array of contacts on the header and urging the memory card backward out of the connector device. Currently, the focus of design efforts in the memory card connector field is on reducing the profile (height, width, etc) and cost of these connectors.

Current prior art connector devices are disadvantageous for several reasons. First, the frames or housings of typical prior art connectors comprise a plurality of individual components that must be assembled to form the completed frame or housing. For example, the opposing guide rails in some prior art connectors are formed separately from the remainder of the frame and must be assembled to the frame. Additionally, static discharge contacts, grounding contacts, and various other functional components are typically formed as separate components that must be assembled on the frame. Because most of the functional components in prior art connectors are formed separately, both cost and assembly time are increased.

Another problem found in most prior art connector devices is that the various components of the ejector mechanism, i.e. the push rod, lever and ejector plate, are coupled together with additional hardware. The additional hardware not only increases the cost and complexity of these devices, but can also result in a higher profile connector.

Yet another disadvantage of most prior art connectors is that the push rod of the ejection mechanism can only be mounted on one side of the connector device; that is, push rod mounting provisions are only formed on one side of the connector device. Thus, a different frame must be manufactured for applications that require the push rod to be mounted on the opposite side. U.S. Pat. No. 5,145,389 (Okubo) describes a connector apparatus that does provide for mounting a push rod on either side of the device. However, the push rod mounts on the Okubo connector are bulky, and the connector also suffers from the other disadvantages described above. For example, the frame of the connector comprises two separate components that must be assembled and secured with additional hardware. Additionally, the lever of the ejection mechanism is mounted to the frame using a separate shaft that increases the cost of the device as well as the assembly time, and the mechanisms for connecting the push rod and ejector plate to the lever are bulky and therefore do not provide a low-profile connection.

Given the numerous disadvantages of prior art memory card connectors, there is a need for a low-cost connector apparatus for memory cards that has a reduced number of separate components, has an extremely low profile, and does not require additional mounting hardware for coupling the various components of the ejector mechanism to the frame and each other. The present invention satisfies these needs.

SUMMARY OF THE INVENTION

The present invention is directed to a connector apparatus for plate-like integrated circuit cards, or "memory cards." The connector apparatus of the present invention comprises a one-piece integrated metallic frame having a cross member and a pair of guide rails integrally extending from the cross member in at least one direction. The guide rails are preferably spaced at an interval substantially equal to the width of a typical memory card. Push rod mounting means are integrally formed on at least one of the guide rails of the one-piece frame for mounting the push rod of an ejector mechanism to the guide rail. In a preferred embodiment, push rod mounting means are symmetrically formed on both guide rails so that the push rod may be mounted to either side of the frame, as desired. Preferably, the push rod mounting means integrally formed on each guide rail comprise a plurality of narrow slots. A contact header is coupled to the frame proximate the cross member thereof and has a plurality of contacts arranged to electrically connect with a memory card inserted between the opposing guide rails.

An ejector mechanism coupled to the one-piece integrated frame comprises a push rod, a lever and an ejector plate. As mentioned, the push rod may be slidably mounted on one of the guide rails via the push rod mounting means integrally formed on that guide rail. In the embodiment described above wherein the push rod mounting means comprise a plurality of narrow slots, the push rod is formed with a corresponding plurality of integral tabs positioned to mate with the corresponding slots on the guide rail. The push rod is mounted on the guide rail by inserting the tabs of the push rod through the corresponding slots on the guide rail. Once mounted, the push rod is operable to slide back and forth lengthwise of the guide rail.

The ejector plate is movably coupled to the frame proximate the cross member and is operable to slide toward and away from the contact header in a direction parallel to the lengthwise extension of the guide rails. The ejector plate has engaging hooks that engage with the forward end face of a memory card connected to the contacts on the contact header. The lever is rotatably mounted on the cross member of the frame. A first end of the lever is coupled to the ejector plate and a second end is coupled to the push rod. Movement of the push rod toward the contact header is translated through the lever into movement of the ejector plate away from the contact header. As the ejector plate moves away from the contact header, the ejection hooks on the ejector plate engage with the forward end face of the memory card and urge the memory card backward out of the connector apparatus.

At least one static discharge contact is preferably integrally formed on at least one of the guide rails of the one-piece metallic frame. Additionally, at least one spring contact may be integrally formed on at least one guide rail for mating with the ground contacts on a Type III PCMCIA memory card.

Preferably, the ejector plate and the lever are positioned on opposite sides of the cross member of the one-piece metallic frame and are coupled to each other through an aperture in the cross member. According to one embodiment, the first end of the lever has an integral claw that extends through the aperture in the cross member to engage with a mating claw integrally formed on the ejector plate.

The lever is preferably coupled to the cross member using a tab and slot mechanism integrally formed on the lever and the cross member. According to one embodiment, the tab and slot mechanism may comprise a circular opening with radially extending slots formed on the cross member, and a corresponding circular projection with radially extending tabs integrally formed on the lever. The lever is coupled to the cross member by aligning the radially extending tabs and slots, inserting the circular projection through the circular opening, and then rotating the lever into place such that the tabs are no longer aligned with the slots and extend past the outer circumference of the circular opening on the opposite side of the cross member. Because the push rod may be mounted on either side of the one-piece integrated frame, the cross member preferably has a pair of such openings symmetrically spaced on either side of the cross member. In this manner, the lever may be selectively coupled to either side of the cross member depending upon which guide rail the push rod is mounted.

Preferably, the second end of the lever is also coupled to the push rod via a tab and slot mechanism integrally formed on the push rod and the second end of the lever. According to one embodiment, the tab and slot mechanism comprises a raised slot integrally formed on the lever and a tab member integrally extending from one end of the push rod. Retaining means are integrally formed at the distal end of the tab member. The push rod is coupled to the lever by inserting the tab member through the raised slot until the retaining means engage. Preferably, the tab member comprises a bifurcated arm having first and second parallel branches spaced at a narrow interval, the retaining means comprising a pair of radially extending projections each integrally formed at the distal end of a respective branch of the bifurcated arm.

Preferably, the one-piece metallic frame is formed from a blank that is stamped from a flat sheet of metal and then bent at predetermined locations to form the guide rails and cross member. Similarly, the push rod is preferably formed from a blank that is stamped from a flat sheet of metal and then folded along the length thereof at predetermined locations to form the push rod. According to one aspect of the present invention, the same push rod blank may be used to form a push rod for mounting on either one of the guide rails.

Preferably, the push rod, the ejector plate and the lever, in addition to the one-piece integrated frame, are formed of metal. The contact header is preferably formed of plastic.

A method of making a connector apparatus in accordance with the present invention comprises the steps of forming a thin metallic blank of a one-piece integrated frame, and then bending the blank at predetermined locations to form a pair of guide rails that integrally extend from a cross member portion of the blank in at least one direction and that are spaced at an interval substantially equal to the width of a memory card. At least one of the guide rails has push rod mounting means integrally formed thereon. Preferably, the blank is bent to form guide rails each having a substantially U-shaped cross-section. A contact header, push rod, ejector plate and lever are then assembled to the one-piece integrated frame.

Additional features of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment that is preferred, it being understood, however, that the invention is not limited to the specific methods and instrumentalities disclosed. In the drawings:

FIG. 6 is a top view of a blank from which the push rod of FIG. 1 is formed;

FIG. 7 is a perspective view of the push rod formed from the blank of FIG. 5;

FIG. 10b is a side view of the contact header of FIG. 10a;

DESCRIPTION OF THE PREFERRED EMBODIMENT

Figure 1:
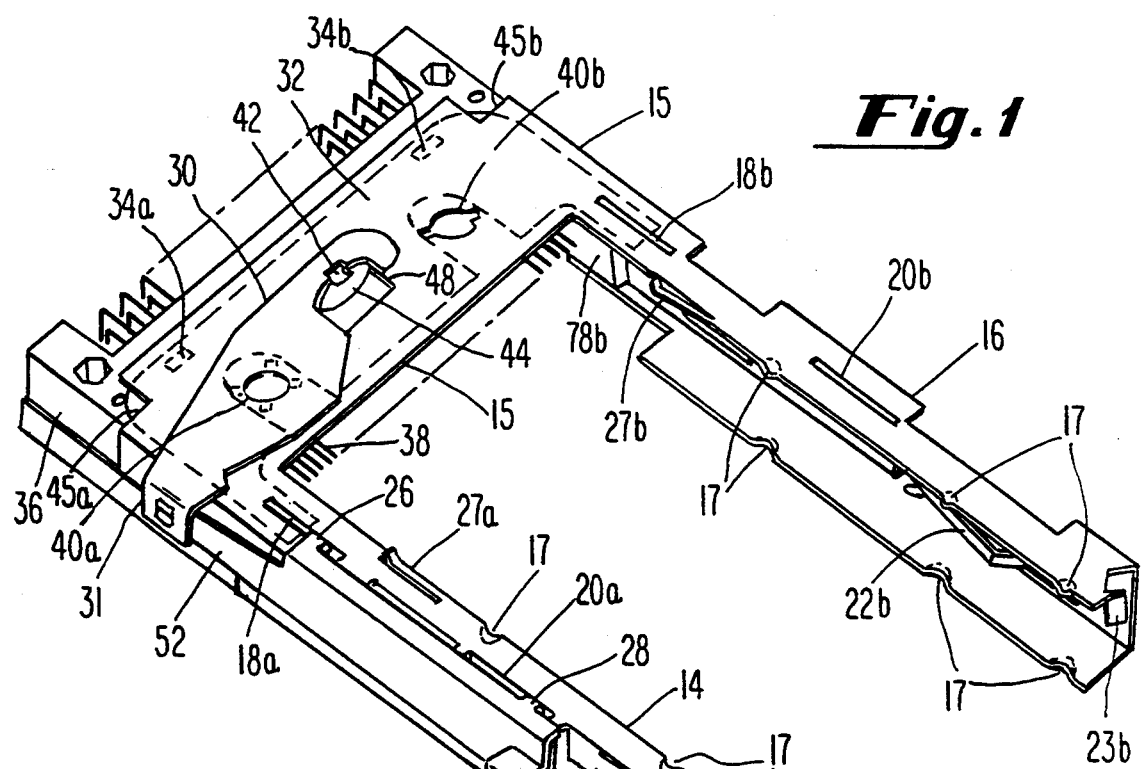
FIG. 1 is a perspective view of a connector apparatus in accordance with a preferred embodiment of the present invention.

Referring to the drawings wherein like numerals indicate like elements throughout, there is shown in FIG. 1 a perspective view of a connector apparatus 10 for a memory card (not shown) in accordance with a preferred embodiment of the present invention. As used herein, the term "memory card" refers to any plate-like integrated circuit card regardless of function, including those specified by the PCMCIA, JEIDA and JEDEC associations. As shown, the connector apparatus 10 comprises a one-piece metallic frame 12 having a pair of guide rails 14, 16 and a narrow cross member 15 integrally extending between the guide rails 14, 16 at one end thereof. The guide rails 14, 16 are spaced at an interval roughly equal to the width of a memory card. As described hereinafter in greater detail, at least one of the guide rails 14, 16, and preferably both guide rails, has mounting means integrally formed thereon so that a push rod may be mounted on the guide rail. FIG. 1 illustrates the mounting of a push rod 24 to guide rail 14. As described hereinafter, the push rod 24 is manually operable to slide back and forth lengthwise of the guide rail 14. A contact header 36 is coupled to the frame 12 proximate the cross member 15. The contact header 36 has an array of contacts 38 arranged to electrically connect with a memory card inserted between the opposing guide rails 14, 16. An ejector plate 32 is movably coupled to the frame proximate the cross member 15. The ejector plate 32 is operable to slide toward and away from the contact header 36 in a direction parallel to the lengthwise extension of the guide rails 14, 16. A pair of engaging hooks 34a, 34b depend from the underside of the ejector plate 32 to engage with a forward end face of a memory card connected to the array of contacts 38 on the contact header 36. A lever 30 is rotatably mounted on the cross member 15 of the frame 12. A first end of the lever 30 is coupled to the ejector plate 32 through an aperture 48 in the cross member 15. A second end of the lever is coupled to the push rod 24, as shown. A plastic button 5 may be inserted into the end of the push rod 24 as shown.

Figure 2:
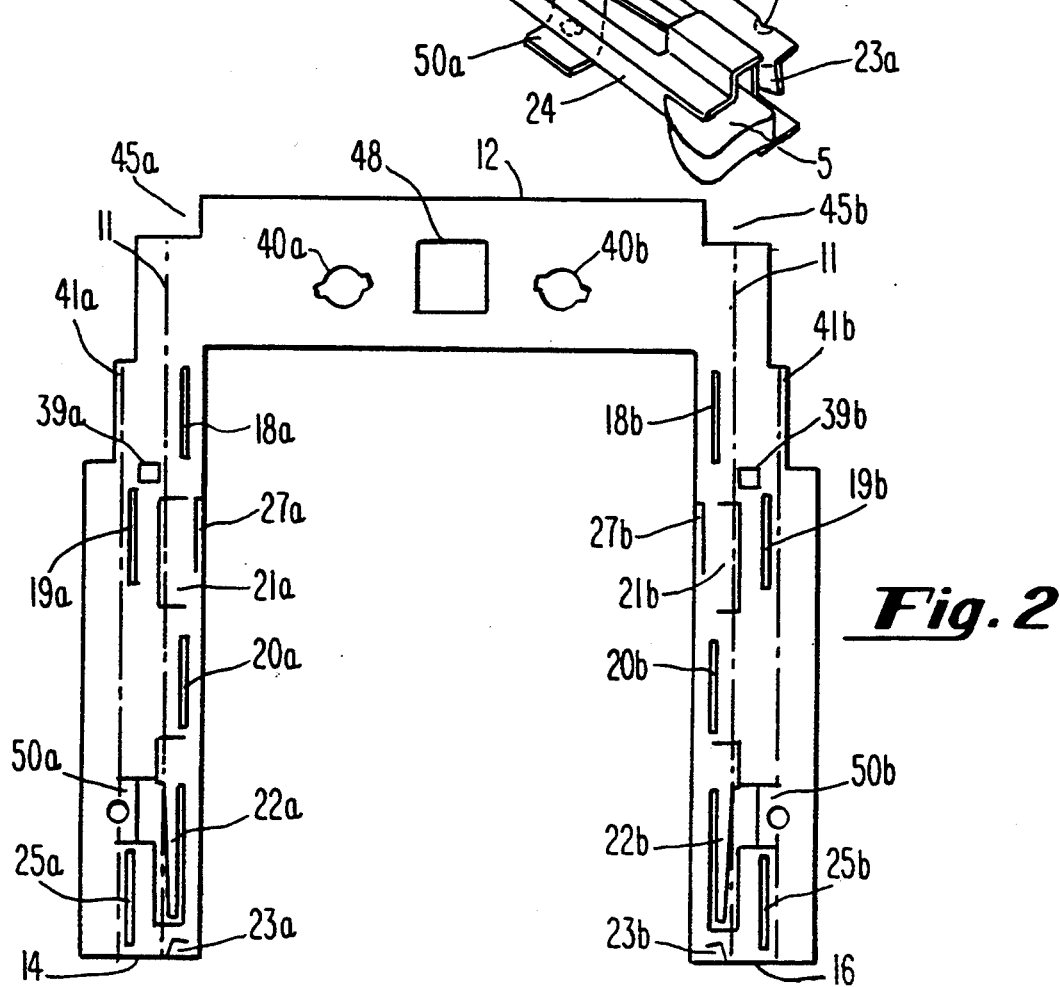
FIG. 2 is a top view of a blank from which the one-piece metallic frame of the connector apparatus of FIG. 1 is formed.
Figure 3:
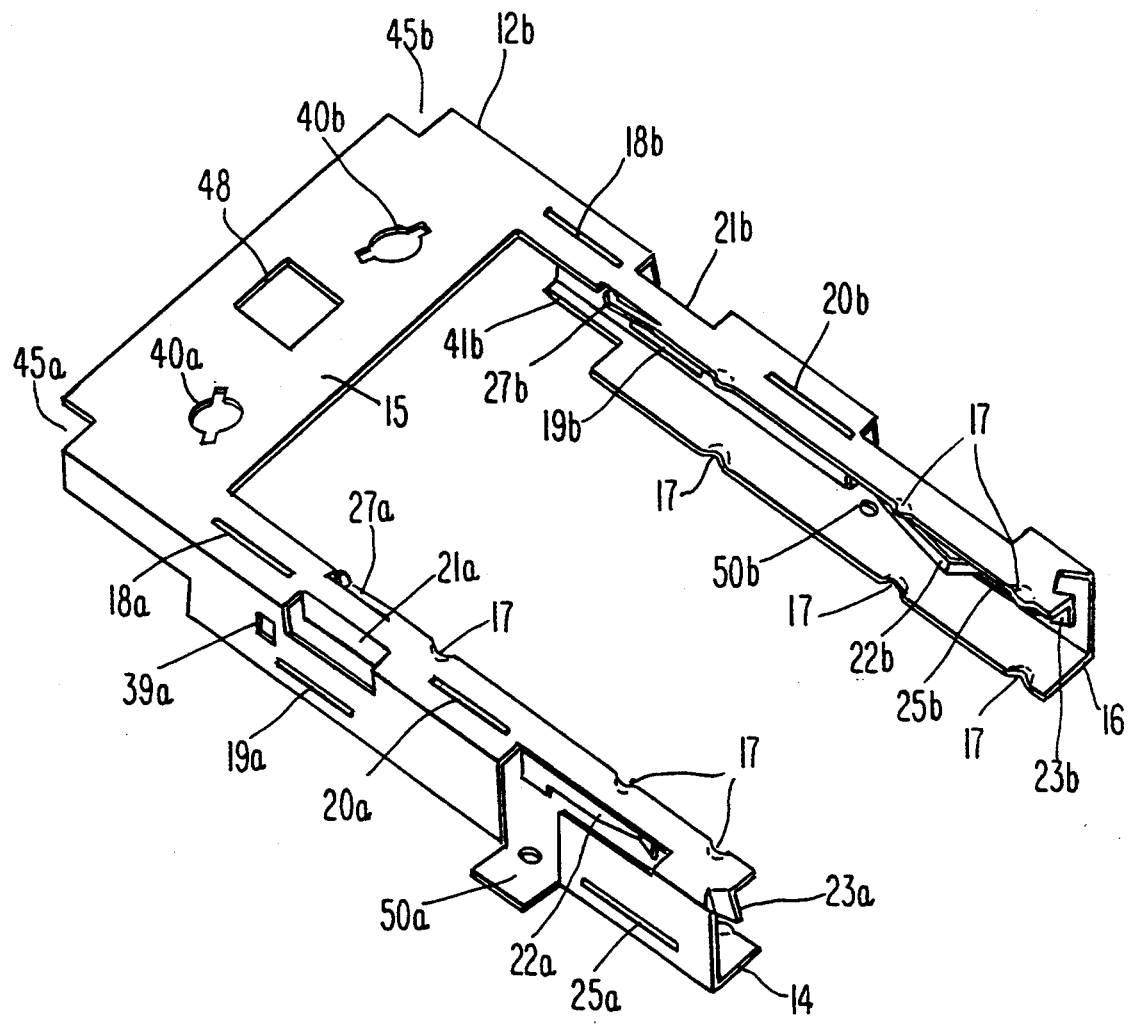
FIG. 3 is a perspective view of the one-piece metallic frame formed from the blank of FIG. 2.

According to an important feature of the present invention, many functional components of the connector apparatus that are normally provided as individual assemblies in prior art connectors, are integrally formed in the one-piece metallic frame 12 of the present invention. FIG. 2 is a top view of the blank of a one-piece integrated frame 12 in accordance with the present invention. The blank shown in FIG. 2 is preferably stamped from a thin sheet of metal and then folded, or bent, in predetermined locations to form the one-piece frame 12. For example, the respective guide rails 14, 16 are formed by bending the blank along the dashed lines 11 in FIG. 2. Preferably, the guide rails 14, 16 each have a substantially U-shaped cross section. FIG. 3 is a perspective view of a one-piece metallic frame 12 as formed from the blank of FIG. 2.

Referring to FIGS. 2 through 5, the integral features of the frame 12 will now be described. As mentioned briefly above, at least one of the guide rails 14, 16 has mounting means integrally formed thereon for mounting a push rod (e.g., push rod 24 of FIG. 1) to the guide rail. According to the preferred embodiment, push rod mounting means are integrally formed on both guide rails 14, 16 so that a push rod can be mounted to either one of the guide rails 14, 16, as desired. Preferably, the push rod mounting means integrally formed on each guide rail 14, 16 comprises a plurality of narrow slots 18, 20, 19 and 25. Slots 18 and 20 are formed on the top of the respective guide rails 14, 16 and slots 19 and 25 are formed on the sides of the respective guide rails 14, 16. As shown, in the preferred embodiment, the arrangement of slots 18, 20, 19, 25 on the respective guide rails 14, 16 is symmetrical, and all of the slots 18, 20, 19, 25 extend in a direction parallel to the lengthwise extension of their respective guide rail 14, 16. The symmetrical arrangement of slots allows a push rod 24 to be selectively mounted to either one of the guide rails 14, 16. An advantage of this feature of the present invention is that the same frame 12 can be used regardless of which guide rail 14, 16 the push rod 24 must be mounted on.

Figures 4, 5:
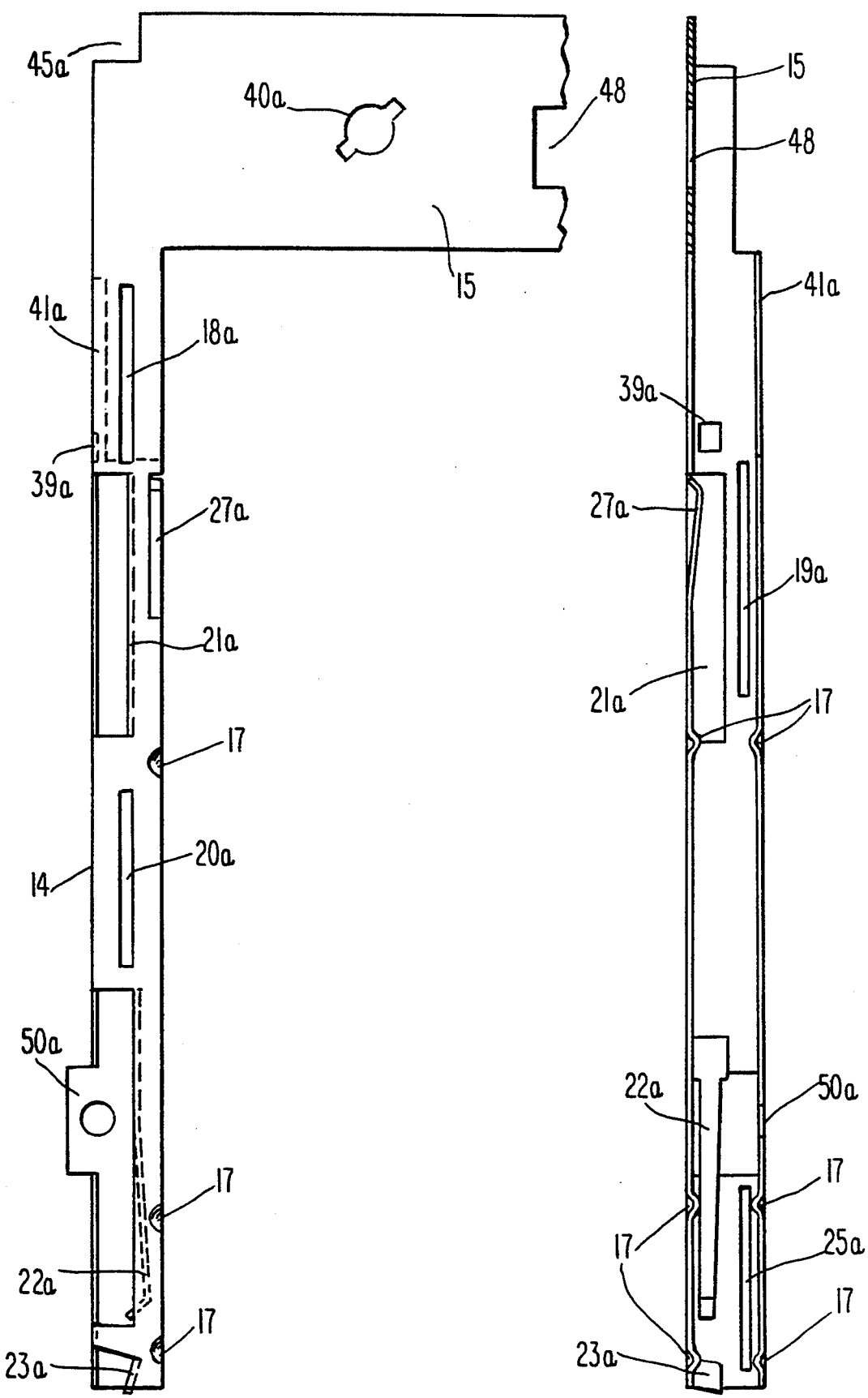
FIG. 4 is a top view of a portion of the frame of FIG. 3.
FIG. 5 is a side view of the portion of the frame shown in FIG. 4.

A first pair of opposing guide members 23a, 23b are integrally formed at the insertion end of the respective guide rails 14, 16 for initially guiding a memory card into the connector apparatus 10. As best shown in FIG. 4, the first pair of guide members 23a, 23b are angled with respect to the insertion direction to allow for, and to correct, any slight misalignment of the card as it is inserted into the connector apparatus 10. A second pair of opposing guide members 21a, 21b are integrally formed on the respective guide rails 14, 16 for further guiding the memory card into the connector apparatus 10. The second pair of guide members 21a, 21b extend parallel to each other and are spaced at an interval substantially equal to the width of a memory card such that the opposing side edges of the memory card fit closely between the respective guide members 21a, 21b.

As can be appreciated from FIGS. 2 and 3, the guide members 23 and 27 are formed from the blank of FIG. 2 by bending the respective guide members downward until they extend substantially perpendicular to the top portion of their respective guide rails 14, 16.

A plurality of small projections 17 are formed at pre-determined locations on the top and bottom surfaces of the respective guide rails 14, 16. FIG. 5 best illustrates the location of the respective projections 17. The spacing between corresponding upper and lower projections 17 is substantially equal to the height of the side edges of a memory card. The projections 17 and guide members 23 and 27 cooperate to form a channel for receiving the memory card.

A pair of static discharge contacts 27a, 27b are integrally formed in the top portion of each guide rail 14, 16. The static discharge contacts 27a and 27b are positioned to mate with corresponding static discharge points on a memory card inserted in the connector apparatus 10. A pair of spring contacts 22a and 22b are also integrally formed on each guide rail 14, 16. The spring contacts 22a and 22b are positioned to mate with corresponding electrical ground contacts provided on the sides of Type III PCMCIA memory cards. Type III PCMCIA cards have been provided with ground contacts at these points in order to reduce EMI (electromagnetic interference) emissions. As best shown in FIGS. 3 and 4, the spring contacts 22a and 22b are bent at their distal ends so that they protrude into the insertion path of a Type III memory card and will springably engage with the ground contacts on the sides of the card when the card is fully inserted. Of course, when a memory card that does not have ground contacts at these points is inserted into the connector apparatus 10, the spring contacts 22a and 22b will simply press harmlessly against the sides of the card.

Mounting members 50a and 50b are integrally formed on the respective guide rails 14, 16 for mounting the connector apparatus 10 on a printed circuit board (not shown) in a host device, such as a notebook, laptop or desktop computer. The depending portions of each contact pin of the contact array 38 typically will be soldered to corresponding points on the circuit board (not shown). Substantially square apertures 39a and 39b are formed on the respective sides of each guide rail 14, 16 for mounting the contact header 36 to the one-piece frame 12. Cutouts 45a and 45b are provided at the outer corners of the cross member 15 to facilitate assembly of the lever 30 to the cross member 15, as described hereinafter. Support members 41a and 41b are provided on the bottom of each guide rail 14, 16 to provide vertical support for the contact header 36. A pair of circular openings with radially extending slots 40a, 40b are symmetrically formed on opposite sides of the cross member 15 so that the lever 30 may be mounted to either side of the cross member 15. An aperture 48 is provided in the center of the cross member 15 for purposes described hereinafter.

FIG. 6 is a top view of a blank from which a push rod, e.g. push rod 24 of FIG. 1, may be formed. According to another important feature of the present invention, the push rod blank may be bent or folded along the dashed lines 67 in either direction to form a push rod for mounting on either one of the guide rails 14, 16. FIG. 7 illustrates the formation of a push rod, e.g. push rod 24 of FIG. 1, for mounting on guide rail 14. However, by folding the blank in the opposite directions, a push rod may be formed for mounting on guide rail 16. Thus, the same blank may be used to form both push rods.

A plurality of tabs 26, 28, 62 and 64 are integrally formed on the push rod 24 and are arranged to mate with the corresponding slots 18a, 20a, 19a and 25a on guide rail 14. One end of the push rod 24 has a tab member 52 integrally formed thereon that preferably comprises a bifurcated arm having first and second branches 54 and 56 spaced at a narrow interval. A pair of radially extending projections 58, 60 are formed at the distal ends of the respective branches 54, 56. As a result of the arrangement of bend lines 67 shown in FIG. 6, the push rod 24 has a sideward extension 63 at the end 61 opposite the tab member 52. Additionally, a cutout 65 is provided near the end 61 of the push rod 24. When the push rod 24 is mounted on a guide rail, e.g. guide rail 14, the cutout 65 ensures access to the mounting means 50 integrally formed on the guide rail. The top 69 of the push rod 24 is wider than the bottom 71 such that the top 69 of the push rod 24 overlaps the top of the guide rail when tabs 26 and 28 are aligned with slots 18, 20.

Figure 8:
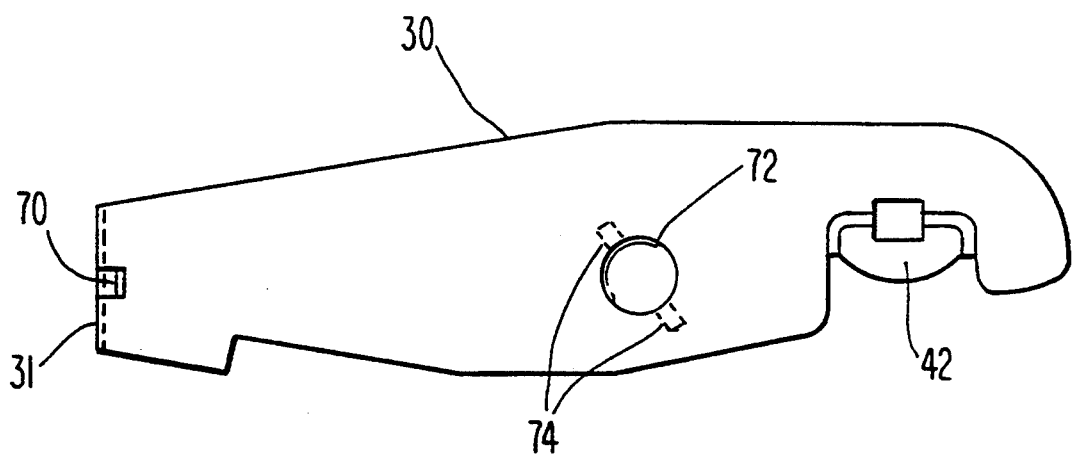
FIG. 8 is a top view of the lever of FIG. 1.
Figure 9:
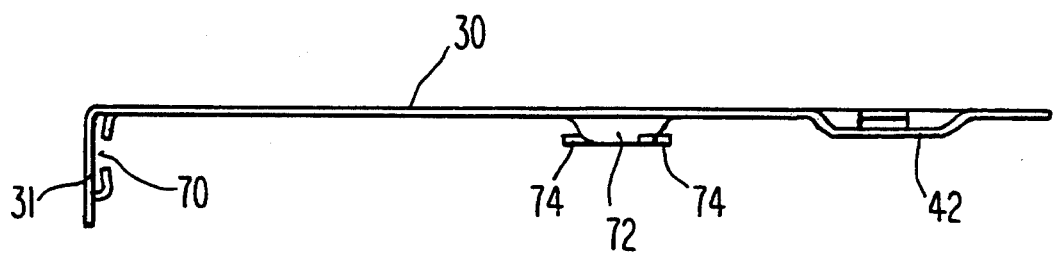
FIG. 9 is a front view of the lever of FIG. 8.

FIGS. 8 and 9 show further details of the lever 30 of FIG. 1. As shown, the lever 30 has a circular projection 72 with radially extending tabs 74 for mounting the lever 30 through one of the slotted openings 40a, 40b in the cross member 15 of the one-piece frame 12. One end of the lever 30 has an integral claw 42 formed thereon for coupling the lever 30 to the ejector plate 32, as more fully described hereinafter. The other end of the lever 30 is bent downward to form a depending side portion 31 of the lever 30. A raised slot 70 is formed on the inner side of the depending portion 31 for coupling the lever 30 to the push rod 24, as more fully described below. The raised slot 70, circular projection 72, radially extending slots 74, and claw 42 may all be integrally formed with the lever by, for example, stamping these features from a blank of the lever.

Figure 10A:
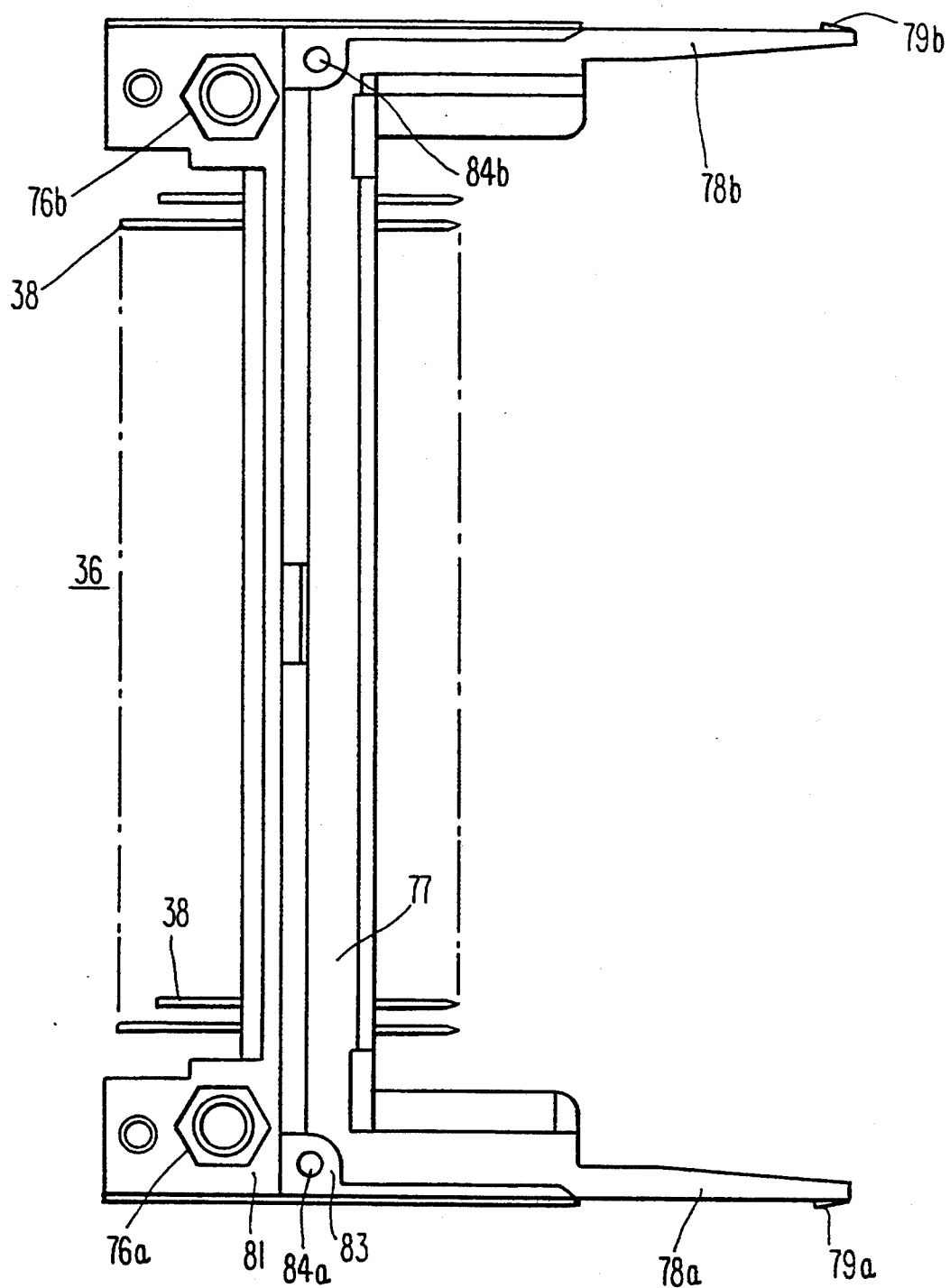
FIG. 10a is a top view of the contact header of FIG. 1.

FIG. 10a is a top view of the contact header 36 of FIG. 1. A contact array 38 is disposed across the width of the contact header 36. Extension arms 78a, 78b extend from respective sides of the contact header 36. Each extension arm 78a, 78b has a respective projection 79a, 79b integrally formed at its distal end. During assembly of the connector apparatus 10, the contact header 36 is coupled to the one-piece frame 12 by inserting the extension arms 78a, 78b into the respective guide rails 14, 16 at the end proximate the cross member 15. The contact header is inserted between the respective guide rails 14, 16 until the projections 79a, 79b on the respective arms 78a, 78b snap into the respective apertures 39a, 39b in the guide rails 14, 16. Once positioned within the frame, the upper surfaces 83 on the contact header abut the underside of the cross member 15. A surface 77 on the contact header 36 forms a recessed ledge that supports the ejector plate 32 and allows it to slide toward and away from the contact array 38.

Figure 10B:
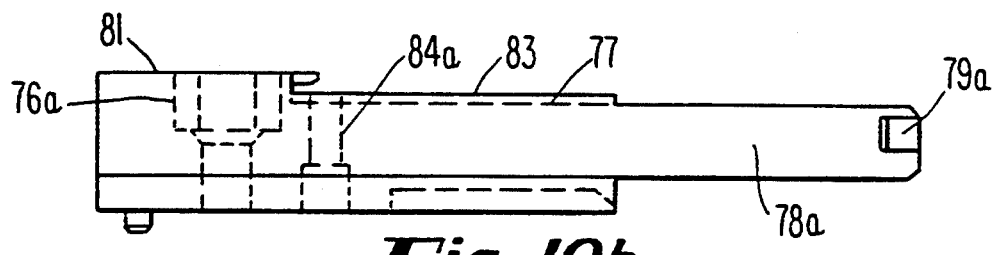

FIG. 10b is a side view of the contact header 36 of FIG. 10a. FIG. 10b illustrates the respective elevations of the surfaces 81, 83 and 77 of the contact header 6. Mounting holes 76a and 76b are integrally formed in the contact header 36 to facilitate connection of the contact apparatus 10 to a host device (not shown). Additional mounting holes 84a and 84b may also be provided.

Figure 11:
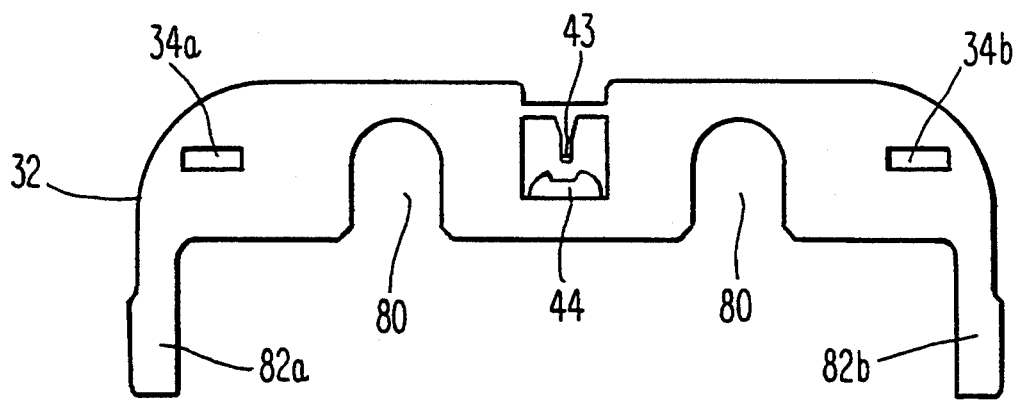
FIG. 11 is a top view of the ejector plate of the connector apparatus of FIG. 1.
Figure 12:
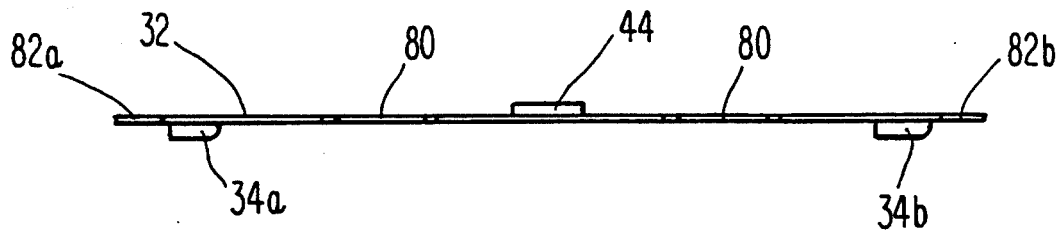
FIG. 12 is a front end view of the ejector plate of FIG. 11.

FIGS. 11 and 12 show further details of the ejector plate 32. As shown, the ejector plate 32 has a pair of ejection hooks 34a, 34b depending from the underside of the ejector plate 32. Arms 82a and 82b extend from respective sides of the ejector plate 32. When the connector apparatus 10 is fully assembled, the arms 82a and 82b are slidingly supported on the recessed ledge 77 of the contact header 36. As further shown, an integral claw 44 and a small projection 43 are formed in the center of the ejector plate 32. U-shaped cutouts 80 are symmetrically positioned on either side of the ejector plate. The cutouts 80 enable the ejector plate 36 to avoid interference with the circular projection 72 and radially extending tabs 74 of the lever 30 when the lever 30 is mounted to the cross member 15.

Figure 13:
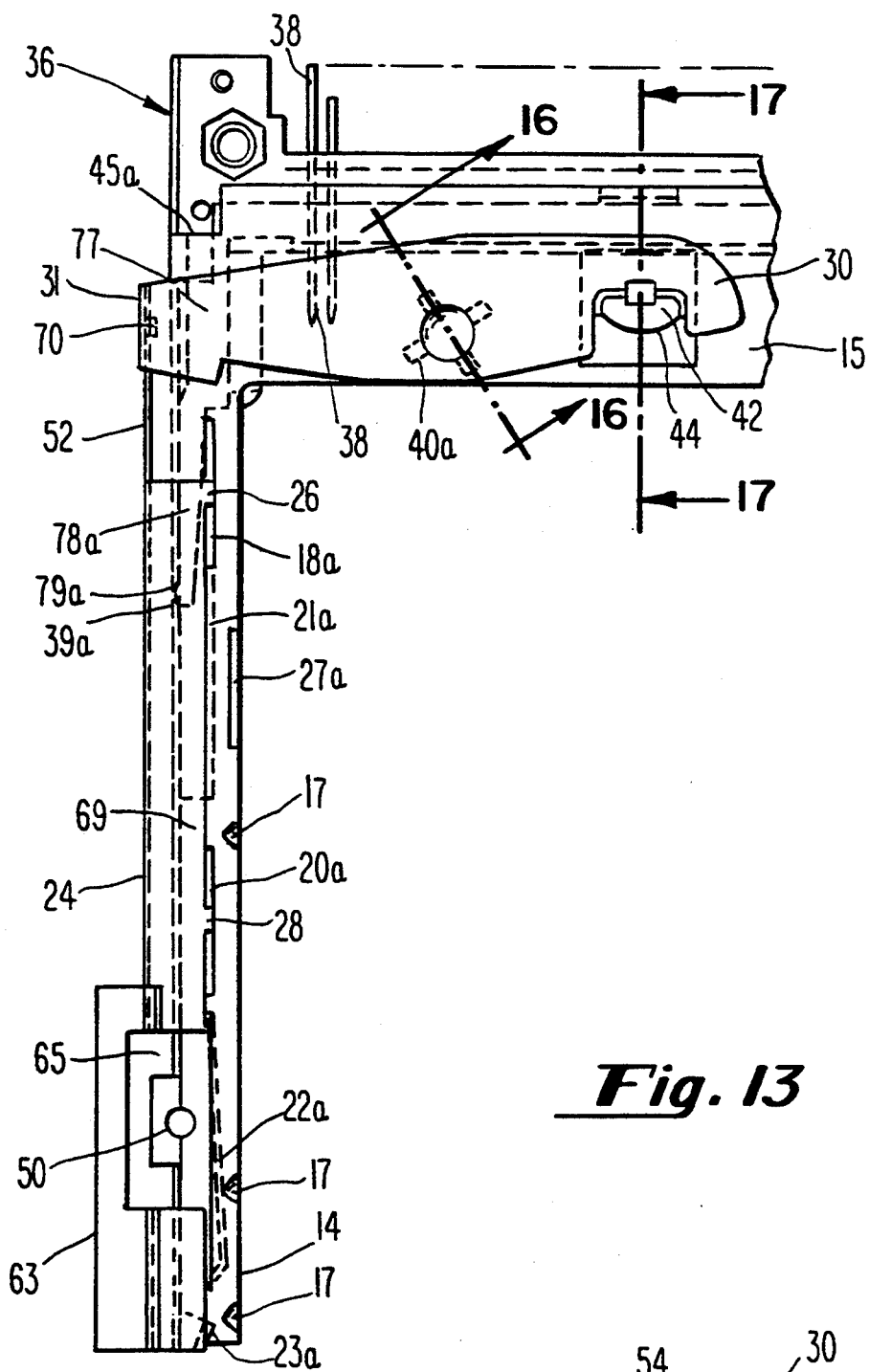
FIG. 13 is a top view of a portion of the assembled connector apparatus of FIG. 1.

FIG. 13 is a top view of a portion of the assembled connector apparatus 10 of FIG. 1. In the example shown in FIG. 13, the push rod 24 is mounted on guide rail 14. However, the push rod 24 may alternatively be mounted on guide rail 16 in the same manner. As mentioned, the symmetry of the one-piece frame allows a push rod to be mounted on either side of the frame 12. As further shown in FIG. 13, the push rod 24 is mounted on the guide rail 14 by inserting the tabs 26, 28 in the respective slots 18a, 20a on the top of the guide rail 14. Tabs 62, 64 (not shown) are similarly inserted through respective slots 19, 25 (not shown) in the side of guide rail 14. As mentioned previously, a portion of the top 69 of the push rod 24 overlaps the top of the guide rail 14. Tabs 26, 28 and 62, 64 are able to slide within their respective slots 18, 20 and 19, 25 so that the push rod 24 can slide back and forth lengthwise of the guide rail 14.

Figure 16:
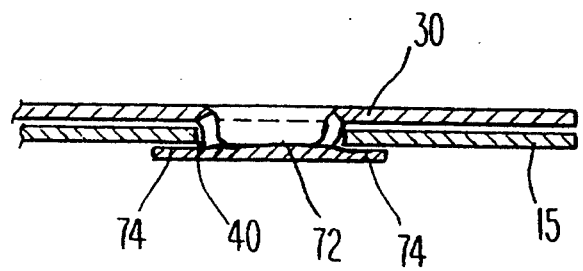
FIG. 16 is a sectional view of the connector apparatus of FIG. 13 taken along line 16—16.

The lever 30 is rotatably mounted on the cross member 15 by first aligning the radially extending tabs 74 on the circular projection 72 of the lever 30 with the radially extending slots of the opening 40a in the cross member 15 and then inserting the circular projection 72 through the opening 40a. Once the circular projection 72 has been inserted through the opening 40a, the lever 30 is rotated into the position shown in FIG. 13 so that the radially extending tabs 74 are no longer aligned with the radially extending slots. Cutouts 45a and 45b are provided at the corners of the frame 12 so that the corners do not interfere with the depending portion 31 of the lever 30 as it is rotated into place. As illustrated in FIG. 16, the radially extending tabs 74 extend past the outer circumference of the opening 40a thereby retaining the lever 30 on the cross member 15 while allowing the lever 30 to rotate in a plane parallel to the plane of the cross member 15. As can be appreciated, if the push rod 24 were instead mounted on guide rail 16, the lever 30 would be mounted on the opposite side of the cross member 15 through slotted opening 40b.

Figure 14:
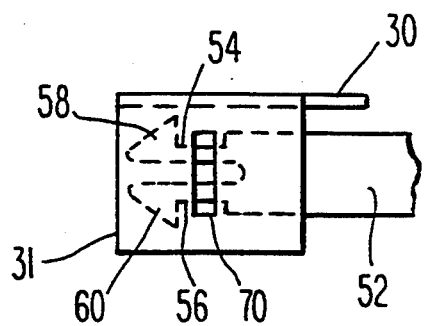
FIG. 14 is a side view of a portion of the assembled connector apparatus of FIG. 1.

Referring again to FIG. 13, the push rod 24 is coupled to the depending portion of the lever 30 by inserting the tab member 52 through the raised slot 70 integrally formed on the inner side of the depending portion 31. FIG. 14 illustrates this coupling in greater detail. As can be appreciated, as the tab member 52 is pushed through the raised slot 70, the inclined edges of the respective projections 58, 60 engage with the respective sides of the raised slot 70. The engagement of the inclined edges with the respective sides of the raised slot 70 causes the first and second branches 54, 56 of the bifurcated arm of the tab member 52 to spring together so that the projections 58, 60 are able to slide through the raised slot 70. Once the projections 58, 60 have passed through the raised slot 70, the first and second branches 54, 56 spring outward to their original positions such that the rear edges of each projection 58, 60 extend past the respective sides of the raised slot 70 and prevent the push rod 24 from moving backward out of the raised slot 70. As can be appreciated, the push rod 24 and lever 30 will move back and forth in tandem during manual operation of the push rod 24. When the push rod 24 is pushed toward the contact header 36, the lever 30 will rotate accordingly causing the opposite end of the lever 30 to move away from the contact header 36.

Figure 15:
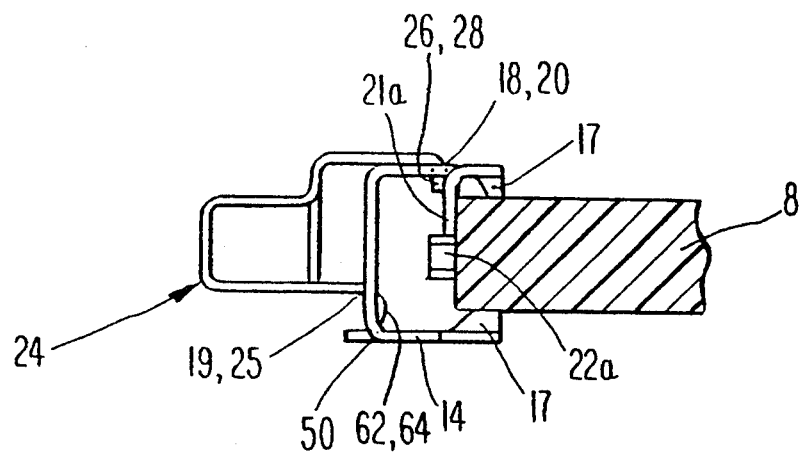
FIG. 15 is an end view of one of the guide rails of the connector apparatus of FIG. 1 illustrating further details of the mounting of a push rod to the guide rail.

FIG. 15 is an end view of the connector apparatus 10 of FIG. 13 illustrating further details of how the push rod 24 is mounted on the guide rail 14. As shown, tabs 26 and 28 on the push rod 24 are inserted through the respective slots 18a and 20a on guide rail 14. Tabs 62 and 64 of the push rod 24 are inserted through the corresponding slots 19a and 25a on the side of the guide rail 14. FIG. 15 also illustrates the insertion of an exemplary memory card 8 along guide rail 14. As shown, the projections 17 on the top and bottom surfaces of the guide rail 14 provide vertical guidance for the card 8. Guide member 21a provides lateral guidance for the card 8. Spring contact 22a engages with the side of the memory card 8. For convenience of illustration, guide member 23a is not shown.

As can be appreciated, the use of tab and slot arrangements for mounting the push rod 24 to the guide rail 14, for coupling the push rod 24 to the lever 30, and for coupling the lever 30 to the cross member 15 eliminates the need for additional coupling hardware found in many prior art connectors and greatly simplifies assembly. Additionally, the tab and slot arrangements provide an extremely low-profile coupling. Those skilled in the art will appreciate that the present invention is not limited to the particular tab and slot structures illustrated in the present embodiment. Other structures may be employed without deviating from the spirit and scope of the present invention.

Figure 17:
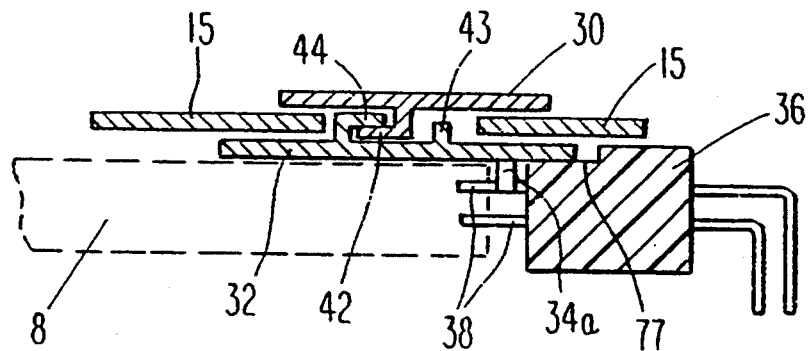
FIG. 17 is a sectional view of the connector apparatus of FIG. 13 taken along line 17—17.

FIG. 17 is a cross sectional view of the connector apparatus taken along line 17—17 of FIG. 13. As shown, the ejector plate 32 and lever 30 are positioned on opposite sides of the cross member 15. In the preferred embodiment, the ejector plate 32 is positioned on the underside of the cross member 15, and the lever 30 is positioned on the upper surface of the cross member 15. However, the respective positions could be reversed.

As shown, the lever 30 is coupled to the ejector plate 32 through the aperture 48 in the cross member 15. Specifically, the integral claw 42 formed on the lever 30 mates with a corresponding claw 44 integrally formed on the ejector plate 32. As can be appreciated, therefore, movement of the lever 30 away from the contact header 36 will cause the ejector plate 32 to move in the same direction. Similarly, movement of the ejector plate 32 toward to the contact header 36 will cause the lever 30 to move in that direction. A small projection 43 is also integrally formed on the ejector plate 32 so as to be positioned behind the claw 42 of the lever 30. Projection 43 is provided so that if the push rod 24 is manually pulled away from the contact header 36, the ejector plate 32 will move in the opposite direction. As mentioned previously, the ejector plate 32 has a pair of ejection hooks 34a, 34b depending therefrom. Ejection hook 34a is illustrated in the Figure. As shown, ejection hook 34a is arranged to engage with the forward end face 7 of a memory card 8 inserted into the connector apparatus 10.

Figure 18:
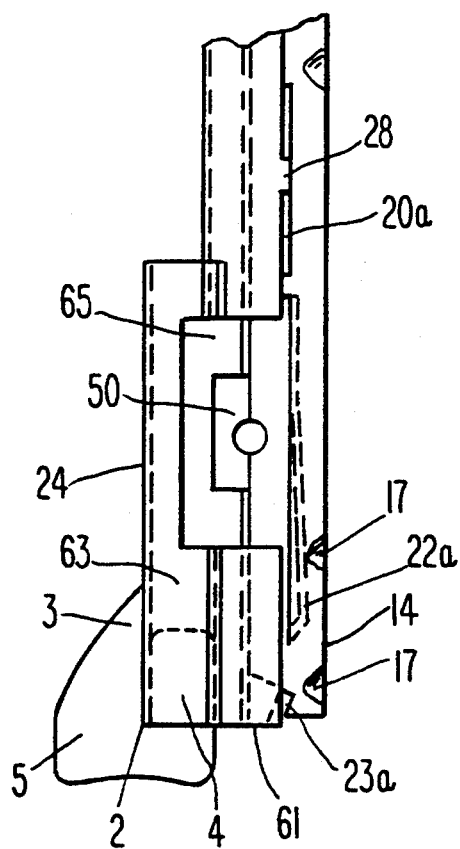
FIG. 18 is a top view of a portion of the connector apparatus of FIG. 1 illustrating further details of the plastic button.
Figure 19A:
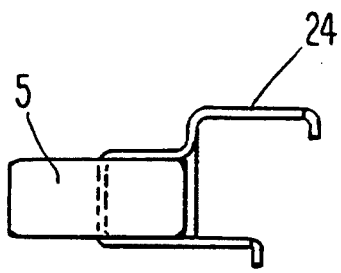
FIGS. 19a and 19b show alternate orientations of the plastic button of FIG. 18.
Figure 19B:
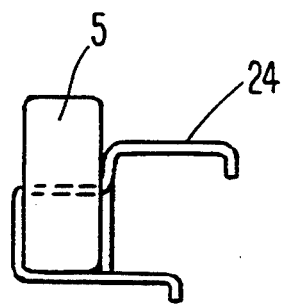

FIG. 18 illustrates further details of the plastic button 5 of FIG. 1. As shown, the plastic button 5 is slotted to form an insertion member 4 and a stabilizing member 3. The plastic button 5 is mounted on the end 61 of the push rod 24 by inserting the insertion member 4 into the sideward extension 63 of the push rod 24. The slot 2 that forms the respective members 3, 4 is preferably dimensioned so that the opposing surfaces of the insertion member 3 and stabilizing member 4 fit tightly against the respective surfaces of the push rod 24. As shown in FIGS. 19a and 19b, the plastic button 5 may be mounted in either a horizontal or vertical orientation.

Referring again to FIG. 17, in use, when a memory card, e.g., memory card 8, is inserted into the connector apparatus 10 and pushed into engagement with the contact array 38, the forward end face 7 of the card 8 engages with the pair of ejection hooks 34a, 34b thereby pushing the ejector plate 32 toward the contact header 36. The movement of the ejector plate 32 toward the contact header 36 is translated through lever 30 into movement of the push rod 24 away from the contact header 36. When it is desired to remove the memory card 8 from the connector apparatus 10, the user manually pushes the push rod 24 toward the contact header 36. As can be appreciated, motion of the push rod 24 toward the contact header 36 is translated through the lever 30 into movement of the ejector plate 32 away from the contact header 36. As the ejector plate 32 moves away from the contact header 36, the ejection hooks 34a, 34b engage with the forward end face 7 of the memory card 8 thereby disconnecting the card 8 from the contact array 38 and pushing the card 8 backward out of the connector apparatus 10.

As the foregoing illustrates, the present invention is directed to a connector apparatus having a one-piece integrated metallic frame 12 that is easy to manufacture and significantly reduces the overall cost of the connector apparatus 10. By integrating many of the functional components in a one-piece frame 12, the number of components in the connector apparatus 10 is greatly reduced, and the assembly of the connector apparatus 10 is greatly simplified. The use of tab and slot arrangements for coupling various components of the ejector mechanism to the one-piece frame 12 eliminates the need for additional mounting hardware and substantially reduces the profile of the connector. A preferred embodiment allows symmetrical placement of a push rod 24 on either side of the frame 12. The present invention may be embodied in other specific forms without departing from the spirit or central attributes thereof, and, accordingly, reference should be made to the following claims rather than to the foregoing specification as indicating the scope of the present invention.

What is claimed is:

1. A connector apparatus for a plate-like integrated circuit card, comprising:
   a one-piece metallic frame having a cross member and a pair of guide rails integrally extending from said cross member in at least one direction and spaced at an interval substantially equal to a width of said plate-like integrated circuit card, at least one of the guide rails having push rod mounting means integrally formed on said one-piece frame;
   a push rod slidably mounted to said at least one guide rail via the push rod mounting means integrally formed thereon, said push rod being operable to slide back and forth lengthwise of said at least one guide rail;
   a contact header coupled to said frame proximate the cross member thereof and having a plurality of contacts arranged to electrically connect with a card inserted between said guide rails;
   an ejector plate movably coupled to said frame proximate the cross member thereof and operable to slide toward and away from said contact header in a direction parallel to the lengthwise extension of the guide rails, said ejector plate having engaging hooks to engage with a forward end face of an integrated circuit card connected to the contacts on said contact header; and
   a lever rotatably mounted on the cross member of said frame and having a first end coupled to said ejector plate and a second end coupled to said push rod.

2. A connector apparatus as recited in claim 1 wherein the push rod mounting means integrally formed on said at least one guide rail comprises a plurality of narrow slots formed on said at least one guide rail, and wherein said push rod has a plurality of tabs integrally formed thereon and arranged to correspond with the plurality of narrow slots on said at least one guide rail, said push rod being mounted on the guide rail by inserting the tabs on the push rod through the corresponding narrow slots on the guide rail, the tabs on said push rod being operable to slide in the narrow slots when said push rod is driven back and forth lengthwise of the guide rail.

3. A connector apparatus as recited in claim 1 wherein each of said guide rails has push rod mounting means integrally formed thereon so that the push rod may be selectively mounted to either one of said guide rails.

4. A connector apparatus as recited in claim 1 wherein at least one static discharge contact is integrally formed on at least one of the guide rails of said one-piece metallic frame.

5. A connector apparatus as recited in claim 1 wherein at least one spring contact for mating with a ground contact on a Type III memory card is integrally formed on at least one of the guide rails of said one-piece metallic frame.

6. A connector apparatus as recited in claim 1 wherein said ejector plate and said lever are positioned on opposite sides of the cross member of said one-piece metallic frame, and wherein the first end of said lever is coupled to said ejector plate via an aperture in the cross member.

7. A connector apparatus as recited in claim 1 wherein said one-piece metallic frame is formed from a blank that is stamped from a flat sheet of metal and then bent at predetermined locations to form the guide rails.

8. A connector apparatus as recited in claim 1 wherein said push rod is formed from a blank that is stamped from a flat sheet of metal and then folded along the length thereof at predetermined locations to form said push rod.

9. A connector apparatus as recited in claim 1 wherein the length and width dimensions of said ejector plate are less than or equal to the respective dimensions of said cross member.

10. A connector apparatus as recited in claim 1 wherein said push rod, said ejector plate and said lever are formed of metal, and wherein said contact header is formed of plastic.

11. A connector apparatus as recited in claim 1 wherein each of said integrally extending guide rails has a substantially U-shaped cross section formed by bending a blank of the one-piece frame at predetermined locations.

12. A connector apparatus as recited in claim 1 wherein said lever is rotatably coupled to said cross member via a tab and slot mechanism integrally formed on said lever and said cross member.

13. A connector apparatus as recited in claim 12 wherein the tab and slot mechanism comprises a circular opening with radially extending slots integrally formed on the cross member and a circular projection with radially extending tabs integrally formed on the lever, said lever being rotatably mounted on said cross member by aligning the radially extending tabs and slots, inserting the circular projection through the circular opening, and then rotating the lever into place such that the tabs are no longer aligned with the slots and extend past the outer circumference of the circular opening on the opposite side of said cross member.

14. A connector apparatus as recited in claim 13 wherein the cross member has a pair of circular openings with radially extending slots symmetrically spaced about a midpoint of the cross member, said lever being selectively mounted through one of said pair of openings depending upon on which guide rail the push rod is mounted.

15. A connector apparatus as recited in claim 1 wherein the second end of said lever is coupled to said push rod via a tab and slot mechanism integrally formed on said push rod and the second end of said lever.

16. A connector apparatus as recited in claim 15 wherein the tab and slot mechanism comprises a raised slot integrally formed on the second end of said lever, and a tab member integrally extending from one end of the push rod, the tab member having a retaining means integrally formed at the distal end thereof, said push rod being coupled to said lever by inserting the tab member through the raised slot, the tab member being retained in the slot by the retaining means.

17. A connector apparatus as recited in claim 16 wherein the tab member comprises a bifurcated arm having first and second parallel branches, and wherein the retaining means comprises a pair of radially extending projections each integrally formed at the distal end of a respective branch of said arm.

18. A connector apparatus as recited in claim 17 wherein each projection has a rearward edge extending outward from its respective branch substantially perpendicular thereto and an inclined forward edge adapted to slidingly engage with a respective side of the raised slot as the bifurcated arm is inserted therethrough, the engagement of the inclined edges with the respective sides of the raised slot operating to force the first and second branches of said arm together so that the projections are able to slide through the raised slot, the first and second branches springing outward once the rearward edge of each projection passes through the slot.

19. A one-piece integrated metallic frame for use in a connector apparatus for plate-like integrated circuit cards, comprising:
a cross member; and
a pair of guide rails integrally formed with said cross member and extending therefrom in at least one direction, said guide rails being spaced at an interval substantially equal to a width of a plate-like integrated circuit card, at least one of the guide rails having push rod mounting means integrally formed on said one-piece frame.

20. A one-piece integrated metallic frame as recited in claim 19 wherein the push rod mounting means integrally formed on said at least one guide rail comprises a plurality of narrow slots formed in said at least one guide rail, and wherein a push rod to be mounted to said at least one guide rail has a plurality of tabs integrally formed thereon and arranged to correspond with the plurality of narrow slots on the guide rail.

21. A one-piece integrated metallic frame as recited in claim 19 wherein each of said guide rails has push rod mounting means integrally formed thereon so that a push rod may be selectively mounted to either one of said guide rails.

22. A one-piece integrated metallic frame as recited in claim 19 wherein at least one static discharge contact is integrally formed on at least one of the guide rails of said one-piece metallic frame.

23. A one-piece integrated metallic frame as recited in claim 19 wherein at least one spring contact for mating with a corresponding ground contact on a Type III memory card is integrally formed on at least one of the guide rails of said one-piece metallic frame.

24. A one-piece integrated metallic frame as recited in claim 19 wherein the cross member of said frame has at least one opening for mounting a rotatable lever to the cross member.

25. A one-piece integrated metallic frame as recited in claim 19 wherein said one-piece metallic frame is formed from a blank that is stamped from a flat sheet of metal and then bent at predetermined locations to form the guide rails and cross member.

26. A one-piece integrated metallic frame as recited in claim 19 wherein each of said integrally extending guide rails has a substantially U-shaped cross section formed by bending a blank of the one-piece frame at predetermined locations.

27. A one-piece integrated metallic frame as recited in claim 19 wherein the cross member has an aperture extending therethrough at about the midpoint thereof so that an ejector plate and a lever positioned on opposite sides of the cross member may be coupled to each other through the aperture.

28. A one-piece integrated metallic frame as recited in claim 27 wherein said at least one opening comprises a circular opening with radially extending slots for mounting a rotatable lever having a circular projection with radially extending tabs.

29. A one-piece integrated metallic frame as recited in claim 27 wherein the cross member has a pair of openings symmetrically spaced about a midpoint of the cross member for selectively mounting a rotatable lever to either side of said cross member.

30. A method of making a connector apparatus for plate-like integrated circuit cards, comprising the steps of:
forming a thin metallic blank of a one-piece integrated frame; and
bending the blank at predetermined locations to form a pair of guide rails that integrally extend from a cross member portion of the blank in at least one direction and that are spaced at an interval substantially equal to a width of a plate-like integrated circuit card, at least one of the guide rails having push rod mounting means integrally formed on said one-piece frame.

31. A method of making a connector apparatus as recited in claim 30 wherein the blank is bent at said predetermined locations to form guide rails each having a substantially U-shaped cross-section.

32. A method of making a connector apparatus as recited in claim 30, further comprising the step of integrally forming at least one static discharge contact on at least one of the guide rails of said one-piece metallic frame.

33. A method of making a connector apparatus as recited in claim 30, further comprising the step of integrally forming, on at least one of the guide rails, at least one spring contact for mating with a corresponding ground contact on a Type III memory card.

34. A method of making a connector apparatus as recited in claim 30 wherein the step of forming a blank of the one-piece integrated frame comprises stamping the blank from a sheet of metal.

35. A method of making a connector apparatus as recited in claim 30, further comprising the steps of:
   mounting a push rod on said at least one guide rail of said frame via the push rod mounting means integrally formed on said at least one guide rail;
   coupling an ejector plate to said frame proximate the cross member thereof; and
   coupling a lever to the cross member of said frame such that the lever is operable to rotate in a plane parallel to the plane of the cross member, the lever having a first end and a second end.

36. A method of making a connector apparatus as recited in claim 35 wherein push rod mounting means are integrally formed on each of the guide rails, and wherein the push rod is mounted on a selected one of the guide rails.

37. A method of making a connector apparatus as recited in claim 35 wherein the push rod mounting means integrally formed on said at least one guide rail comprises a plurality of narrow slots formed in said at least one guide rail, and wherein the push rod has a plurality of tabs integrally formed thereon and arranged to correspond with the plurality of narrow slots on the guide rail, and further wherein the step of mounting the push rod to said at least one guide rail comprises inserting the tabs on the push rod through the corresponding narrow slots on the guide rail, the tabs on said push rod being operable to slide in the narrow slots when said push rod is driven back and forth lengthwise of the guide rail.

38. A method of making a connector apparatus as recited in claim 35 wherein the ejector plate and the lever are positioned on opposite sides of the cross member, further comprising the step of coupling one end of the lever to the ejector plate through an aperture in the cross member.

39. A method of making a connector apparatus as recited in claim 35 wherein the cross member has a circular opening with radially extending slots and the lever has a circular projection with radially extending tabs, and wherein the step of coupling the lever to the cross member comprises the steps of:
   aligning the radially extending tabs on the lever with the radially extending slots of the circular opening of the cross member;
   inserting the circular projection through the circular opening; and thereafter,
   rotating the lever into place such that the tabs are no longer aligned with the slots and extend past the outer circumference of the circular opening on the opposite side of said cross member.

40. A connector apparatus as recited in claim 35 further comprising the step of coupling one end of the lever to the push rod via a tab and slot mechanism integrally formed on said push rod and said one end of the lever.

41. A connector apparatus as recited in claim 40 wherein the tab and slot mechanism comprises a raised slot integrally formed on said one end of the lever and a tab member integrally extending from one end of the push rod, the tab member having a retaining means integrally formed at the distal end thereof, and wherein the step of coupling the push rod to said one end of the lever comprises inserting the tab member through the raised slot until the tab member is retained in the slot by the retaining means.

* * * * *